Patented July 14, 1936

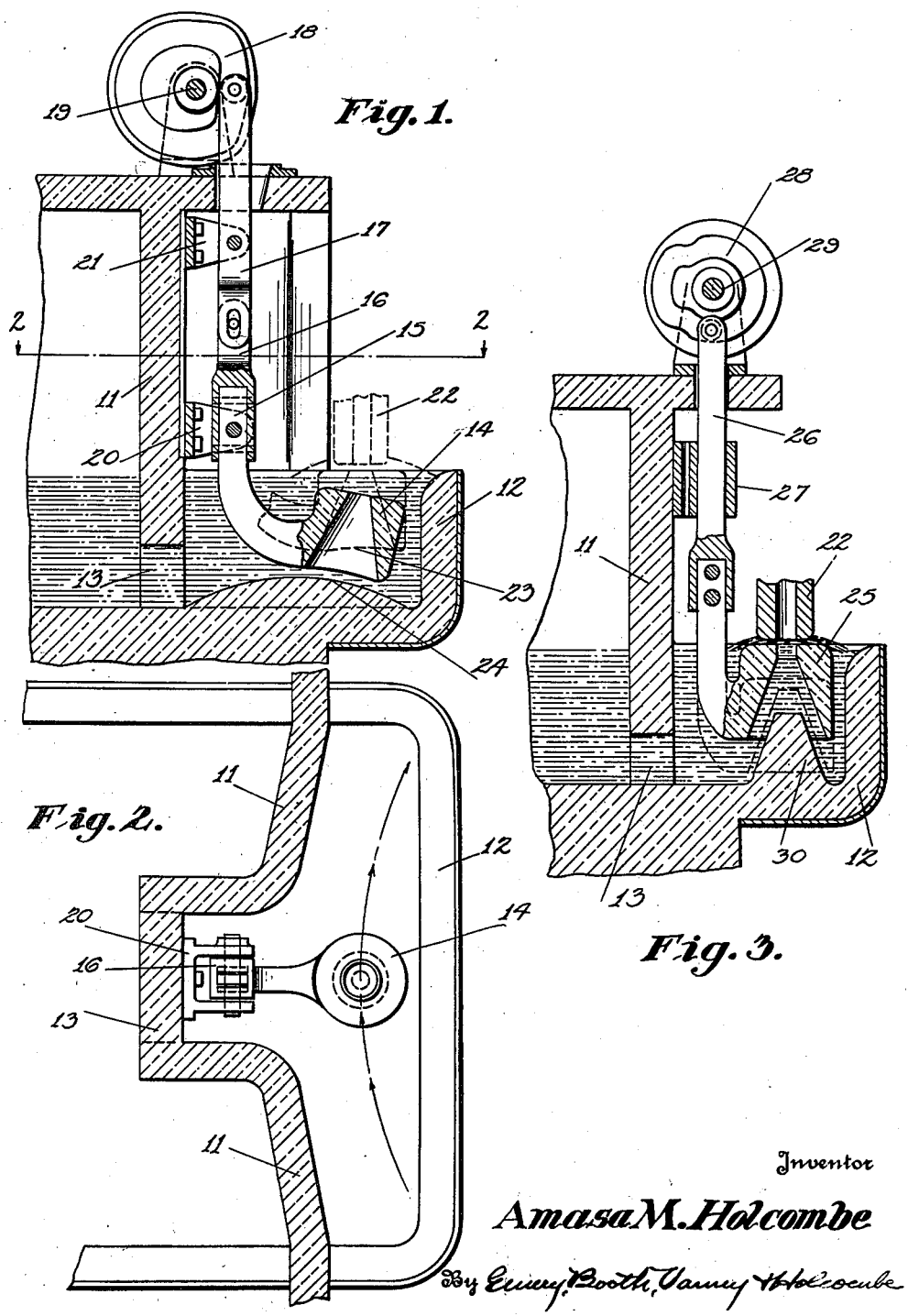

2,047,913

UNITED STATES PATENT OFFICE 2,047,913

PROCESS OF AND APPARATUS FOR SUPPLYING MOLTEN GLASS TO FORMING MACHINES

Amasa M. Holcombe, Washington, D. C., assignor to Lynch Corporation, a corporation of Indiana Application August 13, 1929, Serial No. 385,588

36 Claims. (Cl. 49—56)

This invention relates to glass working, particularly to a mode of operation of automatic glassware forming machinery whereby the molds thereof may be supplied with molten glass at a uniform and suitable temperature for producing well formed ware.

The invention pertains to the construction and operation of the glass melting tank, forehearth and feeding devices for furnishing fresh charges of molten glass in rapid succession ready to be gathered or sucked up as required by the forming machine.

Glassware forming machines as heretofore constructed have been of two general types, those fed by semi-molten glass flowing down from a forehearth or tank positioned above the machine, known as the "gob" or "flow" feed type; and those fed from a pool below the machine by sucking the molten glass up into the molds. This invention relates to the latter type, and aims to present successive charges of fresh hot glass to the gathering head of the machine without having to lower the latter to engage the surface of the pool.

Experience has shown that the cold metal of the gathering heads, or molds thereon, chills the glass in the forehearth in the spot where contact is made, and a further aim of the invention is to promote circulation of the molten glass in the forehearth, and to maintain a constant flow of hot glass from the tank to the forehearth, preventing any chilling of the glass at the gathering point and insuring a continuous supply of uniformly hot charges of glass to the molds.

Further aims and advantages of the invention appear in the following description of illustrative modes of operation and apparatus for practicing the invention, reference being had to the accompanying drawing, wherein Fig. 1 is a vertical cross-section of a portion of a glass melting tank provided with a forehearth embodying features of the invention;

Fig. 2 is a plan and horizontal section of the same, the section being taken on the line 2—2 in Fig. 1; and Fig. 3 is a view similar to Fig. 1, showing a modified form of apparatus.

In the apparatus shown in Figs. 1 and 2, the front wall 11 of the glass melting and heating tank is provided with one or more fore bays or open hearths 12 supplied with molten glass through a submerged passage 13, thereby preventing stones, scum and bits of cold glass that may be floating on the surface of the molten glass in the tank from reaching the forehearth.

A paddle or valve 14 made of suitable refractory material is submerged in the glass at the feeding point in the fore bay, and suitable mechanical devices are provided for periodically moving this paddle or valve up and down in the viscous glass. In the form illustrated in Figs. 1 and 2, the paddle has an arm 15 which projects above the surface of the glass and is secured in a socket in the lower end of a pivotally mounted holder 16, the upper end of which is engaged by a lever arm 17 to move it back and forth according to the position of the grooved cam 18 on the rotating shaft 19 which extends over the top of the hearth.

The holder 16 and lever 17 are supported in pivot bearings 20, 21, suitably mounted in a recess in the front wall 11 of the tank, where they are protected from the heat of the tank, and are not in the way of the gathering head or the molds 22 of the forming machine.

The paddle or valve 14 may advantageously be provided with a center orifice or funnel 23, for conducting molten glass from the bottom of the forehearth to the surface at the gathering point, and the bottom of the hearth may be shaped to cooperate therewith, whereby the paddle in its movement up and down operates as a valve to force the viscous glass through the funnel to the gathering point and lift it into the path of movement of the open lower ends of the suction molds. The paddle operating mechanism is synchronized with the forming machine driving motor so as to lift the viscous glass above it into position to be engaged by the molds on the gathering heads as they sweep by in their horizontal path of rotation.

The cam groove 18 is so shaped as to cause a rapid lowering and immediate return of the paddle, followed by a considerable dwell in its upper position, thereby forcing the molten glass between it and the bottom protuberance 24 upward through the funnel, and then lifting it above the normal level of the glass in the tank and fore bay and holding it there until engaged by the open lower end of the next suction mold as they pass successively by. These molds are ordinarily provided with a shearing device to sever the glass in the filled mold from that in the fore bay, the stringy ends being swept out of the way of the next charge by the movement of the molds.

The dwell of the paddle at the upper limit of its movement is sufficient for fresh hot glass to flow in from the tank to fill the space beneath the paddle left by its upward surge, and this glass is forced up through the funnel 23 when the paddle comes down, thereby causing a constant stream of hot glass to flow to the delivery point above the orifice in the paddle. Thus the paddle operates as a valve or pump, due to the viscosity and sluggish action of the molten glass and its tendency to pile up on the paddle before it can flow away.

In the modified form of apparatus shown in Fig. 3, the paddle 25 is mounted for vertical movement in a sliding holder 26 in suitable guides 27 secured on the front wall 11 of the tank, and is moved up and down by a cam 28 on a rotating shaft 29 positioned above the fore bay and driven in synchronism with the forming machine by any suitable means. The bottom of the fore bay is formed with a conical protuberance 30 which assists in forcing the molten glass through the funnel in the paddle. The operation of this form of device is substantially the same as that shown in Figs. 1 and 2.

The advantages of the invention are manifest, both in providing a supply of successive charges of hot glass fresh from the tank, and in greatly simplifying and lightening the construction of the gathering head of the forming machine and its cooperating parts by raising the glass to the suction molds instead of having to lower the latter to the surface of the glass in the fore bay as in this type of glass forming machines as heretofore constructed.

This invention is not restricted to the forms of apparatus shown in the drawing, nor to the precise mode of operation described.

What I claim and desire to secure by Letters Patent is as follows:

1. The method of gathering molten glass from a gathering hearth having an exposed surface which comprises moving a suitable gathering device over the hearth and simultaneously intermittently raising an unconfined body of glass in the hearth into contact with said gathering device.

2. The method of gathering molten glass from a gathering hearth supplied from a tank which consists in moving a series of suitable gathering devices in succession into position over the gathering hearth, and simultaneously therewith periodically lifting an unconfined body of molten glass into contact with said respective gathering devices.

3. The method of gathering molten glass from a gathering hearth supplied from a tank which consists in moving a series of gathering devices in succession into position over the gathering hearth, periodically lifting an unconfined body of molten glass into contact with the respective gathering devices as they severally occupy the gathering position, and applying suction in said gathering devices to fill said devices with glass.

4. The method of gathering molten glass from a gathering hearth supplied from a tank which consists in moving a series of gathering devices in a single uniform horizontal plane and in succession into position over the gathering hearth, and simultaneously therewith lifting an unconfined body of molten glass to the fixed plane of said gathering devices and into contact therewith, and applying suction in said gathering devices to fill said devices with glass during movement thereof.

5. The method of gathering molten glass in the manufacture of glass articles, which consists in moving a series of gathering molds in succession in a single horizontal plane above an open-topped receptacle containing molten glass, and successively raising an unconfined portion of the glass in said receptacle into contact with said molds whereby they may be filled by means of suction applied thereto.

6. The method of gathering molten glass in the manufacture of glass articles, which consists in moving a series of gathering molds in succession in a predetermined path over an open-topped receptacle containing molten glass, and successively and intermittently raising an unconfined portion of the glass in said receptacle into contact with said molds whereby they may be filled by means of suction applied thereto.

7. The method of obtaining mold charges of glass in the manufacture of hollow glass containers which consists in moving an open bottom parison mold in a single horizontal plane at a predetermined level above an open topped receptacle containing a supply of molten glass, lifting an unconfined portion of the glass in said receptacle in synchronism with the positioning of the mold above it to establish an operative charging relation therewith, and applying suction in said mold to cause said glass to fill said mold.

8. The method of obtaining mold charges of glass in the manufacture of hollow glass containers which consists in moving an open bottom parison mold in a predetermined path over an open-topped receptacle containing a supply of molten glass, periodically lifting an unconfined portion of the glass in said receptacle to establish an operative charging relation therewith and in predetermined timed relation to the movement of the mold into charging position, applying suction in said mold to cause said glass to fill said mold, and thereafter shearing the mold charge from the glass supply.

9. Glass gathering apparatus comprising a gathering hearth in communication with a tank of molten glass, a gathering device comprising a mold having an open bottom movable into cooperative charging relation in a predetermined plane above said hearth, means operative in said hearth in predetermined timed relation to the movement of the mold into charging position effective to intermittently lift an unconfined portion of the glass therein into contact with the bottom of the mold, and means for applying suction within said mold to fill it.

10. Glass gathering apparatus comprising a gathering hearth in communication with a tank of molten glass, a series of transversely moving gathering molds successively movable into cooperative charging relation in a predetermined plane above said hearth, means operative in said hearth wholly below the level of the glass therein effective to lift an unrestricted body of glass therein into contact with the bottoms of the successive molds, and means for applying suction within each mold to fill it while in contact with said glass.

11. Glass gathering apparatus comprising a gathering hearth in communication with a tank of molten glass, a gathering device comprising a mold having a bottom opening movable into cooperative charging relation in a predetermined plane above said hearth, means vertically movable in said hearth effective to lift an unconfined body of glass therein into contact with the bottom of the mold, and means for applying suction within said mold to fill it.

12. Glass gathering apparatus comprising a gathering hearth in communication with a tank of molten glass, a gathering device movable into cooperative charging relation in a predetermined plane above said hearth, means operative in said hearth wholly below the level of the glass therein and operating in predetermined timed relation to the movement of the mold over said hearth and effective to lift an unrestricted body of glass therein into contact with the bottom of the mold, and means for applying suction within said mold to fill it.

13. Glass gathering apparatus comprising an open-topped gathering hearth, a supply tank, a gathering mold movable over said hearth in predetermined spaced relation to the glass therein, and means movable within said hearth, and periodically operable to raise the level of an unconfined body of the glass therein into charging contact with said mold.

14. Glass gathering apparatus comprising an open-topped gathering hearth adapted to be supplied with molten glass from a supply tank, and means normally submerged in the glass in said hearth and periodically movable below the level of the glass in the hearth to raise the level of an unrestricted portion of glass therein.

15. Glass gathering apparatus comprising an open-topped gathering hearth adapted to be supplied with molten glass from a supply tank, a member movably supported by said hearth and having a portion continuously submerged in the glass therein, and means for operating said member to cause said submerged portion to move in substantially a vertical direction to raise the level of an unrestricted portion of glass in said hearth.

16. Glass gathering apparatus comprising an open-topped gathering hearth adapted to be supplied with molten glass from a supply tank, a member movably supported by said hearth and having a portion normally submerged in the glass therein, and synchronizable means for operating said member to cause said submerged portion to move in substantially a vertical direction wholly below the level of the glass to raise the level of an unrestricted portion of the glass in said hearth.

17. Glass gathering apparatus comprising an open-topped gathering hearth adapted to be supplied with molten glass from a supply tank, a member movably supported by said hearth and having a portion normally submerged in the glass therein, said submerged portion being provided with an orifice, and means for operating said member to cause said submerged portion to be reciprocated in substantially a vertical direction to force glass through said orifice and raise the level of an unrestricted portion of the glass above said orifice.

18. Glass gathering apparatus comprising an open-topped gathering hearth adapted to be supplied with molten glass from a supply tank, and a horizontally extending paddle normally submerged in the glass in the hearth provided with a vertically extending orifice and periodically movable wholly below the level of the glass in said hearth to raise the level of an unrestricted portion of the glass therein.

19. Glass gathering apparatus comprising an open-topped gathering hearth adapted to be supplied with molten glass from a supply tank, and a horizontally extending paddle normally submerged in the glass in the hearth provided with a vertically extending funnel shaped orifice, means for moving said paddle up and down, and a protuberance on the bottom of said hearth adapted to cooperate with said paddle when the latter is depressed to raise the level of the glass in said orifice.

20. Glass gathering apparatus comprising a heated tank containing a supply of molten glass, an open-top gathering hearth adjacent thereto and connecting therewith through a submerged passage, and paddle means normally submerged in the glass in said hearth adjacent the gathering position operable periodically to raise the level of an unrestricted portion of glass therein at the gathering position and cause hot glass from said tank to flow into said hearth.

21. In a glass gathering implement adapted to deliver molten glass charges to a suction parison mold from a pool of molten glass in a container, supporting walls extending above the glass in the said container, a plurality of suction parison molds above the said glass supporting walls and means entirely submerged in the glass pool for raising the glass to a charging plane above said supporting walls.

22. The method of feeding glass from a source of heated glass to a gathering device which consists in forming a pool of hot glass, causing a stream of glass to be injected into the glass of the pool at a point below the surface of the glass of the pool and towards its surface and forming an air pressure less than atmospheric at the surface and within the gathering device and in line with the direction of movement of the stream towards the surface.

23. The method of feeding glass from a source of heated glass to a gathering device which consists in producing a pool of hot glass having normally all portions of its surface located in a horizontal plane and producing a stream of hot glass within the glass of the pool at a point below the said plane, forming a bulge of hot glass in the glass surface and locating the port of a gathering device below the surface of the bulge in the glass and subjecting the air confined within the chamber of the gathering device to a pressure less than atmospheric to draw into the gathering device the glass of the stream.

24. The method of feeding glass from a glass furnace to a gathering device which consists in producing a pool of hot glass having a surface in the plane of the surface of the glass in the furnace and located at one side of the body of the glass of the furnace and moving glass from within the furnace and injecting it into the glass of the pool at a point below the level of the glass in the pool, and producing a stream of glass within the glass of the pool from the said point towards the surface of the glass, subjecting the surface of the glass in line with the stream to a pressure less than atmospheric in the gathering device to gather the hot glass from the surface.

25. The method of feeding glass from a source of heated glass to a gathering device which consists in forming a pool of glass having a surface in the same horizontal plane as the surface of the glass of the source, subjecting a portion of glass that lies entirely below the level of the glass in the pool and the source to a pressure to cause movement of glass from the source towards the surface of the pool from a point below the level of the glass in the pool, and subjecting the surface of the glass in a line of the movement of the glass in the pool to a pressure less than atmospheric to gather the hot glass from the source from the pool of glass.

26. A glass feeder for suction molds comprising a container having an opening at its top and adapted to hold a supply of molten glass at a constant level, an upwardly directed nozzle terminating below the surface of glass in the container, and means for intermittently producing a sufficient pressure on the glass at the nozzle to move the level of glass in the container adjacent the nozzle upwardly a substantial distance above the normal level of glass in the container.

27. A glass feeder for suction molds comprising a container having an opening at its top and adapted to hold a supply of molten glass at a constant level, an upwardly directed nozzle located in the container and terminating below the surface of glass therein, and means for creating intermittent impulses of glass through the nozzle and for periodically raising the level of glass adjacent the nozzle to a level above the normal level of the glass in the container.

28. The method of gathering molten glass from a gathering hearth having an exposed surface which comprises moving a suitable gathering device over the hearth and simultaneously raising an unconfined body of glass in the hearth and applying sub-atmospheric pressure in the gathering device to cause said device to be filled with glass drawn from the unconfined raised body of glass.

29. The method of feeding glass which consists in establishing a pool of hot glass having normally all portions of its surface located in a uniform horizontal plane, moving a suitable gathering device over an exposed portion of the pool of glass and simultaneously raising a body of glass in the pool and applying sub-atmospheric pressure in the gathering device to cause said device to be filled with glass drawn from the raised body of glass.

30. The method of gathering glass from a gathering hearth supplied from a tank, wherein the normal level of glass in the hearth and tank is substantially uniform and is below the upper edges of the side walls of said hearth, which consists in moving a gathering device over the hearth and synchronously therewith upwardly surging an unconfined portion of glass in the hearth above the plane of the side walls thereof and into contact with the gathering device, and thereupon filling the gathering device from the upwardly surged body of glass.

31. The method of gathering glass from a gathering hearth supplied from a tank, wherein the normal level of glass in the hearth and tank is substantially uniform and is below the upper edges of the side walls of said hearth, which consists in moving a gathering device over the hearth and synchronously therewith intermittently causing an upward surging of an unconfined portion of glass in the hearth above the plane of the side walls thereof and into contact with the gathering device, and thereupon filling the gathering device from the upwardly surged body of glass.

32. In a glass gathering apparatus adapted to deliver molten glass to a suction gathering device presented from a pool of molten glass in a container, supporting walls extending above the normal level of the glass in said container, means acting independently of the mold and operator to raise an unconfined body of the glass in the container to a charging plane above the supporting walls and into contact with said mold.

33. Glass gathering apparatus comprising an open topped gathering hearth, a supply tank, a gathering mold movable over said hearth in predetermined spaced relation to the glass therein and means movable within the hearth and operable to cause a periodic raising of the level of an unconfined body of glass therein into charging contact with said mold.

34. The method of gathering glass from a gathering hearth which consists in forcibly circulating the glass in said hearth upwardly to periodically surge an unconfined body of glass above the normal level of the glass in the hearth and into contact with a suction gathering device, positioned above the gathering position, and continuously supplying fresh hot glass to the gathering point from regions near the bottom of the hearth.

35. The method of gathering glass in suction gathering molds which consists in successively presenting a mold above the gathering area of a hearth containing a supply of molten glass, raising an unconfined portion of the glass in the hearth from a region near the bottom of the hearth to a level above the normal level of the glass and above the sides of the hearth and continuously supplying fresh hot glass to the region near the bottom of the hearth.

36. The method of gathering glass from a gathering hearth supplied from a tank wherein the normal level of the glass in the hearth and tank is substantially uniform, which consists in periodically presenting a gathering device above an exposed portion of the glass in said hearth, forcibly circulating the glass between said hearth and tank and simultaneously raising a body of glass above the normal level of the glass in said hearth and into charging contact with said gathering device.

AMASA M. HOLCOMBE.